United States Patent
Porras et al.

(10) Patent No.: US 9,146,759 B2
(45) Date of Patent: *Sep. 29, 2015

(54) ASSUMPTION-BASED COMPILATION

(75) Inventors: Victor Leonel Hernandez Porras, San Francisco, CA (US); Christopher Arthur Lattner, San Jose, CA (US); Jia-Hong Chen, Cupertino, CA (US); Eric Marshall Christopher, Los Gatos, CA (US); Roger Scott Hoover, Cheyenne, WY (US); Francois Jouaux, Woodside, CA (US); Robert John McCall, San Francisco, CA (US); Thomas John O'Brien, San Jose, CA (US); Pratik Solanki, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/847,925

(22) Filed: Jul. 30, 2010

(65) Prior Publication Data

US 2012/0030653 A1   Feb. 2, 2012

(51) Int. Cl.
*G06F 9/45* (2006.01)
*G06F 9/455* (2006.01)

(52) U.S. Cl.
CPC .......... *G06F 9/45525* (2013.01); *G06F 8/4441* (2013.01)

(58) Field of Classification Search
CPC ......... G06F 8/443; G06F 8/433; G06F 8/445; G06F 8/447; G06F 8/52
USPC ......................................... 717/151, 154, 158
See application file for complete search history.

(56) References Cited

U.S. PATENT DOCUMENTS

| 5,857,104 | A | 1/1999 | Natarjan et al. | |
|---|---|---|---|---|
| 6,223,340 | B1 | 4/2001 | Detlefs | |
| 6,658,656 | B1 | 12/2003 | Thompson | |
| 6,799,236 | B1 * | 9/2004 | Dice et al. | 710/200 |
| 6,980,997 | B1 | 12/2005 | Peschel-Gallee et al. | |
| 7,725,885 | B1 * | 5/2010 | Pradhan et al. | 717/148 |
| 7,882,396 | B2 | 2/2011 | Bolignano et al. | |
| 8,127,280 | B2 * | 2/2012 | Thomas et al. | 717/136 |
| 8,291,383 | B1 * | 10/2012 | Evans | 717/124 |
| 8,789,025 | B2 * | 7/2014 | O'Brien et al. | 717/140 |
| 2005/0071831 | A1 * | 3/2005 | Sheikh et al. | 717/151 |
| 2007/0055960 | A1 * | 3/2007 | Damron et al. | 717/131 |
| 2007/0174695 | A1 * | 7/2007 | Varadarajan et al. | 714/15 |

(Continued)

OTHER PUBLICATIONS

Deconinick, G. et al., (1993), "Survey of Backward Error Recovery Techniques for Multicomputers Based on Checkpointing and Rollback", Proc. of Iasted Int. Conf. on Modelling and Simulation, Pittsburgh, PA, May 10-12, 1993, pp. 262-265.*

(Continued)

*Primary Examiner* — Tiphany Dickerson
(74) *Attorney, Agent, or Firm* — Downey Brand LLP (57) ABSTRACT

Techniques for processing source code written in a traditionally interpreted language such as JavaScript, or another dynamic and/or interpreted language, are disclosed. In one example, compiled code associated with the source code is constructed and executed. An assumption on which a specific aspect of the compiled code is based (e.g., an optimization) is tested at a checkpoint of the compiled code. A roll over to fallback code is performed if the test indicates the assumption is not true.

25 Claims, 10 Drawing Sheets

(56) References Cited

U.S. PATENT DOCUMENTS

2007/0250825 A1 10/2007 Hicks et al.
2008/0127134 A1 5/2008 Tirumalai et al.

OTHER PUBLICATIONS

Gschwind, M., et al. (2001), "Optimization and Precise Exceptions in Dynamic Compilation", ACM SIGARCH Computer Architecture News Homepage archive, vol. 29 Issue 1, Mar. 2001, pp. 66-74.*
Riley, N. (2009), "Explicit Software Speculation for Dynamic Language Runtimes", Ph.D. Dissertation University of Illinois at Urbana-Champaign Champaign, IL, May 2009 (84 pages).*
Su, L. et al., (2007), "Speculative Optimization Using Hardware-Monitored Guarded Regions for Java Virtual Machines" VEE'07 Jun. 13-15, 2007, San Diego, California, USA, pp. 22-32.*
Thomson, J. et al., (2009), "Transactional Upgrade Rollback: the DSL Approach", accessed at: http://www.mancoosi.org/reports/tr4.pdf (43 pages).*
Gal, Andreas et al., Trace-based Just-in-Time Type Specialization for Dynamic Languages, Jan. 1, 2009.
Chevalieer-Boisvert, Maxime et al., Optimizing Matlab Through Just-in-Time Specialization, Mar. 20, 2010.
Stphanian, et al., "Inlining Java Native Calls at Runtime" Jun. 2005, ACM, p. 121-131.
Asher, et al., "The Effect of Unrolling and Inlining for Python Bytecode Optimizations," SYSTOR '09, May 2009 (14 pages).
Office Action, U.S. Appl. No. 12/847,904 dated Dec. 14, 2013.
Arnold et al. Adaptive optimization in the Jalapeno JVM. OOPSLA. ACM (2000).
Chambers et al., "An efficient implementation of SELF, a dynamically-typed object-oriented language based on prototypes." LISP & Symbolic Computation, pp. 243-281 (1991).
Chambers et al., "Making pure object-oriented languages practical." OOPSLA Conf. Proc. (Oct. 1991).
Fink et al., "Design, implementation and evaluation f adaptive recompilation with on-stack replacement." Proc. Int'l Symposium on Code Generation and Optimization: feedback-directed and runtime optimization, pp. 241-252 (2003).
Holzle, et al., "Debugging optimized code with dynamic deoptimization." ACM SIGPLAN Conf. on Programming Langauge Design & Implementation (Jun. 1992).
Soman et al., "Efficient and general on-stack replacement for aggressive program specialization." Int'l Conf. on Programming Languages & Compilers (Jun. 2006).
Usenix Assn., "Proc. Java virtual machine research and technology symposium." (JVM) (Apr. 2001).

* cited by examiner

PRIOR ART

ASSUMPTION-BASED COMPILATION

BACKGROUND OF THE INVENTION

Figure 1:
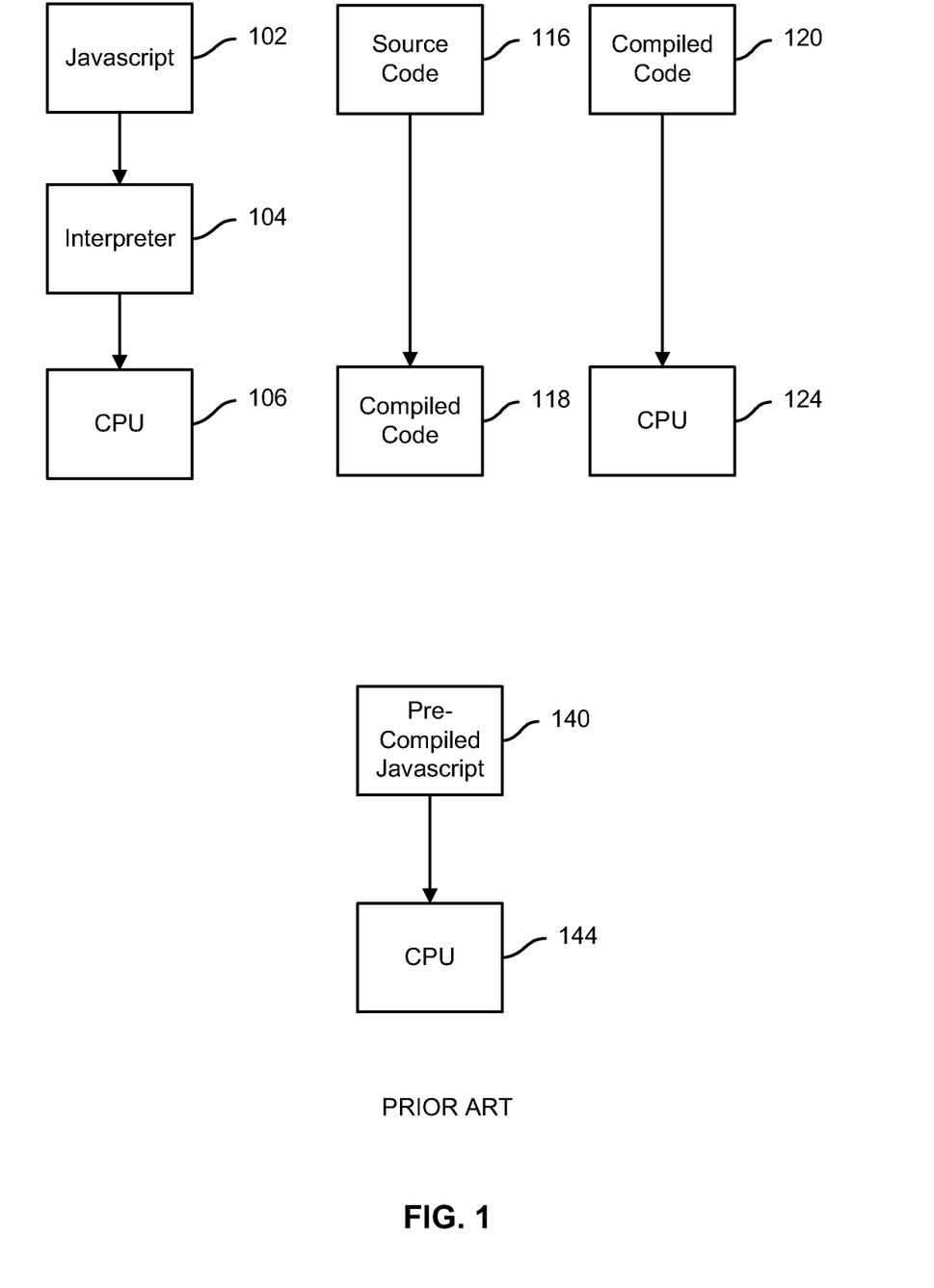

Traditionally, computer code written in an interpreted language such as JavaScript® is not executed directly by a computer processor, and instead must be interpreted at runtime by an interpreter, runtime environment, and/or other software entity. An example of such a typical configuration is shown in FIG. 1, specifically JavaScript® 102 is executed at runtime by an interpreter 104 which interprets the JavaScript® instructions and provides corresponding machine code instructions to central processing unit (CPU) 106 for execution. An interpreted language such as JavaScript® has the advantage of being intuitive, flexible, and easy to program, but such languages may be slow to execute since the code needs to be interpreted line by line at runtime before it can be executed.

By contrast, in traditional compiled programming languages, source code typically is compiled into machine code prior to runtime, e.g., source code 116 shown being compiled into compiled code 118 at a time earlier or separate from runtime in FIG. 1. Machine code comprises very low level instructions, which are typically stored in data storage and subsequently executed directly by a processor, e.g., compiled code 120 shown being provided directly to CPU 124 in FIG. 1, with the result that source code that has been compiled to machine code typically executes on a processor more quickly or efficiently than equivalent interpreted code (e.g., JavaScript®), which requires an interpreter at runtime to execute the equivalent machine code on the processor.

More recently, scripts and other code written in interpreted languages such as JavaScript® have been precompiled to machine code executable directly by a processor, e.g., pre-compiled JavaScript® (i.e., machine code generated prior to runtime based on JavaScript®) 140 shown in FIG. 1 as being provided to CPU 144 for execution at runtime. However, the gains achieved by compiling code written in an interpreted dynamic language such as JavaScript® prior to runtime in the past have been limited by the highly flexible, dynamic, and sometimes unpredictable nature and behavior of code written in such languages. For example, in JavaScript® the variable type of a variable may be dynamically assigned or changed at runtime and, as a result, certain optimizations that could otherwise be performed on a pre-compiled version of such code, for example type-specific optimizations, cannot be performed, resulting in less optimized compiled code.

BRIEF DESCRIPTION OF THE DRAWINGS

Various embodiments of the invention are disclosed in the following detailed description and the accompanying drawings.

Examples of such typical configurations are shown in FIG. 1, specifically JavaScript® 102 being executed at runtime by an interpreter 104 which interprets the JavaScript® instructions and provides corresponding machine code instructions to a central processing unit 106, source code 116 being compiled into compiled machine code 118 prior to runtime, compiled machine code 120 being provided to CPU 124 for execution at runtime, and pre-compiled JavaScript® being provided to CPU 144 for execution at runtime.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 2:
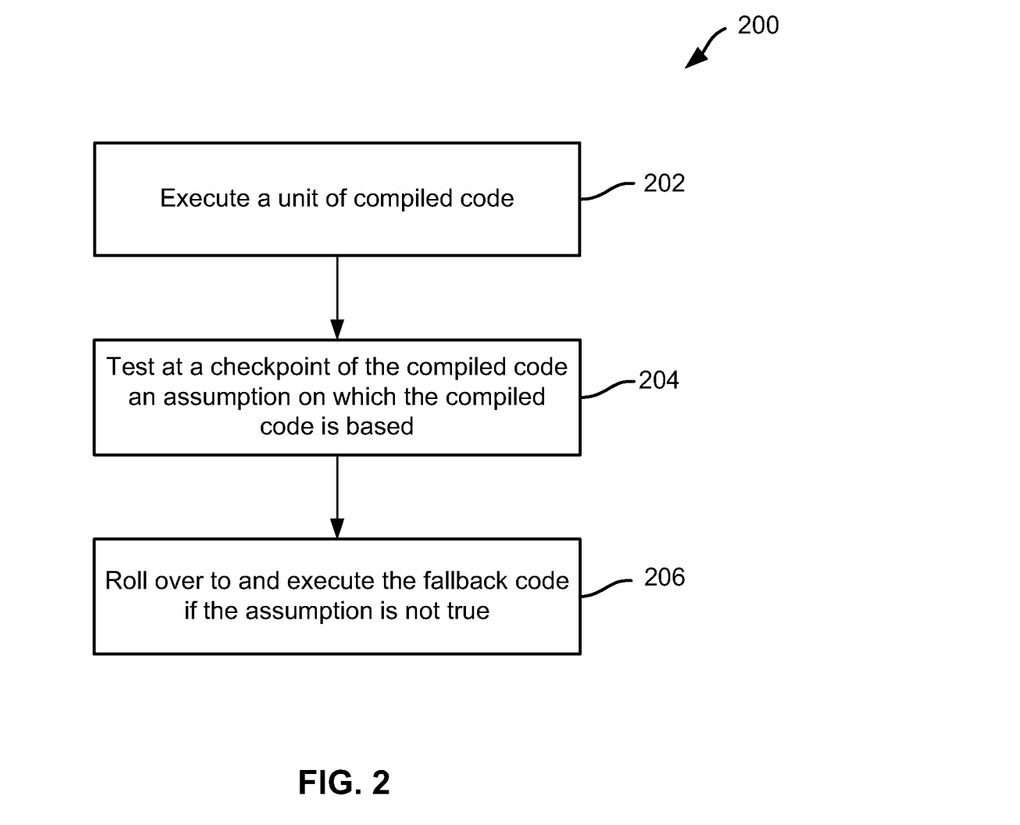
FIG. 2 is a flow diagram illustrating an embodiment of a process for processing source code written in a traditionally interpreted language.

FIG. 2 is a flow diagram illustrating an embodiment of a process 200 for executing software code. In the example shown, a unit of assumption-based compiled code associated with a unit of source code is executed 202. An assumption on which a specific aspect of the assumption-based compiled code is based (e.g., an optimization) is tested at a checkpoint of the compiled code 204. A roll over or transition to fallback code is performed and the fallback code is executed if the test indicates the assumption is not true 206.

In some embodiments, the assumption-based compiled code is low level machine readable code compiled from the source code and is specific to the platform that it is compiled for. The assumption-based compiled code is optimized in some embodiments based on an assumption while the fallback code is not optimized based on this assumption. In some embodiments, the assumption is one of a plurality of assumptions based on which the assumption-based compiled code is optimized. In some embodiments, the assumption is an assumption regarding a variable of the source code. In some embodiments, the assumption is an optimistic assumption of a likely form of the input variable, such as a likely value, type, and/or range of the variable.

In some embodiments, the assumption-based compiled code includes instructions for testing the assumption at the checkpoint, for invoking the fallback code when the assumption is tested not true, and/or for rolling over to the fallback code (e.g., updating the runtime state of the fallback code so that the fallback code can continue correctly from the point where the assumption-based compiled code is rolled over to the fallback code). In some embodiments, the checkpoint is one of a plurality of checkpoints throughout the assumption-based compiled code for testing the assumption and the fallback code is executed when the assumption is tested not true at any one of the checkpoints. In some embodiments, each of the plurality of checkpoints corresponds to a separate unit of fallback code customized to that particular checkpoint. Code execution can continue correctly in the fallback code (from a point corresponding to the particular checkpoint's place in the source code without re-starting the routine) when the assumption is tested to be not true at the particular checkpoint.

In one example, a variable in a unit of source code can be dynamically assigned or changed at runtime to be an integer, float, or string, however based on analysis (e.g., based on dynamic analysis of past runs and/or static analysis of the code), it is determined that the variable may likely be an integer. Consequently, the assumption-based compiled code is optimized by assuming that the variable will be an integer so that the compiled code is simplified and made more efficient in situations where the assumption holds true. However, since the assumption-based compiled code is based on the assumption that the variable is an integer, it may not run correctly and/or efficiently in situations where this assumption does not hold true. In contrast, the fallback code is not based on the assumption and will run correctly when the variable is not an integer, although the fallback code may be less efficient than the assumption-based compiled code when the variable is an integer. The fallback code can be used as a backup for the optimized assumption-based compiled code when the assumption does not hold true.

Figure 3:
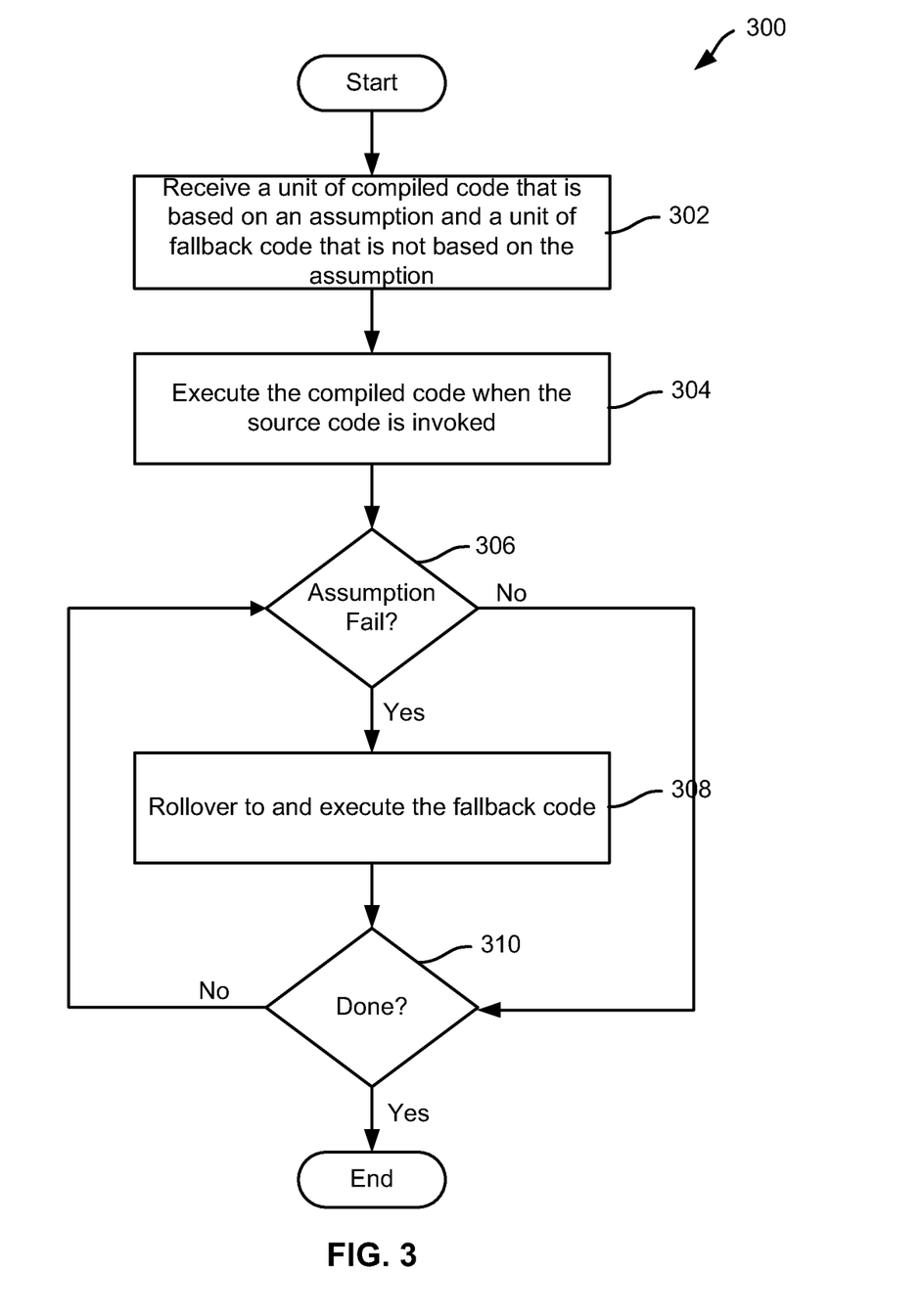
FIG. 3 is a flow diagram illustrating an embodiment of a process for processing source code written in a traditionally interpreted language such as JavaScript®.

FIG. 3 is a flow diagram illustrating an embodiment of a process 300 for executing software code. In the example shown, a unit of assumption-based compiled code associated with a unit of source code and fallback code associated with the source code are received and/or generated locally on a local computing environment 302. The assumption-based compiled code in some embodiments comprises low level machine readable code that is optimized based on an assumption, compiled based on the source code, and is specific to the platform that it is compiled for. In contrast, the fallback code is not optimized based on the assumption. In some embodiments the fallback code is compiled machine code specific to the platform it is compiled for, but is not optimized or otherwise based on the assumption. In some embodiments the fallback code is the original source code which is then interpreted.

The assumption-based compiled form of the source code is executed when the source code is invoked 304. For example when a user browses a webpage and invokes the JavaScript® behind the webpage, a compiled version of the that is optimized based on an assumption is executed. As the assumption-based compiled code is executed, a checkpoint for testing the assumption is encountered and the assumption is tested at the checkpoint 306. For example, the assumption-based compiled code in some embodiments includes checkpoint code configured to test the validity of the assumption, for example at a point in the execution of the assumption-based code that occurs prior to a portion of the code that has been optimized or otherwise based on the assumption. If the assumption is tested to be true at the checkpoint 306, the assumption-based compiled code continues to be executed unless/until the above or in some embodiments another assumption proves false 306 or until execution is done 310. If the assumption is tested to be not true 306, the execution of the assumption-based compiled code is rolled over to the fallback code and the fallback code is executed instead 308. In some embodiments, rollover involves updating the runtime environment of the fallback code so that the fallback code can continue execution correctly from where the assumption-based compiled code stopped, and the system state is as if it has always been executing the fallback code alone, and the assumption-based compiled code had never been executed. In some embodiments, rollover involves rolling back the runtime environment to a saved state of the assumption-based compiled code and then updating the runtime environment of the fallback code with the saved state. In some embodiments, updating the runtime environment of the fallback code involves restoring the local variables and other relevant machine state, which can include but is not limited to register contents, stack state, and memory contents, while leaving the global variables alone. The checkpoint can be located at any appropriate point in the assumption-based compiled code. For example, if a section of the assumption-based compiled code is optimized based on an assumption, checkpoint(s) for the assumption can be placed before or within the section of code, so that the assumption can be tested before the execution of this section of code and/or during the execution of this section of code. Detection and collapsing of redundant checkpoints can be used to further optimize the assumption-based compiled code.

Figure 4:
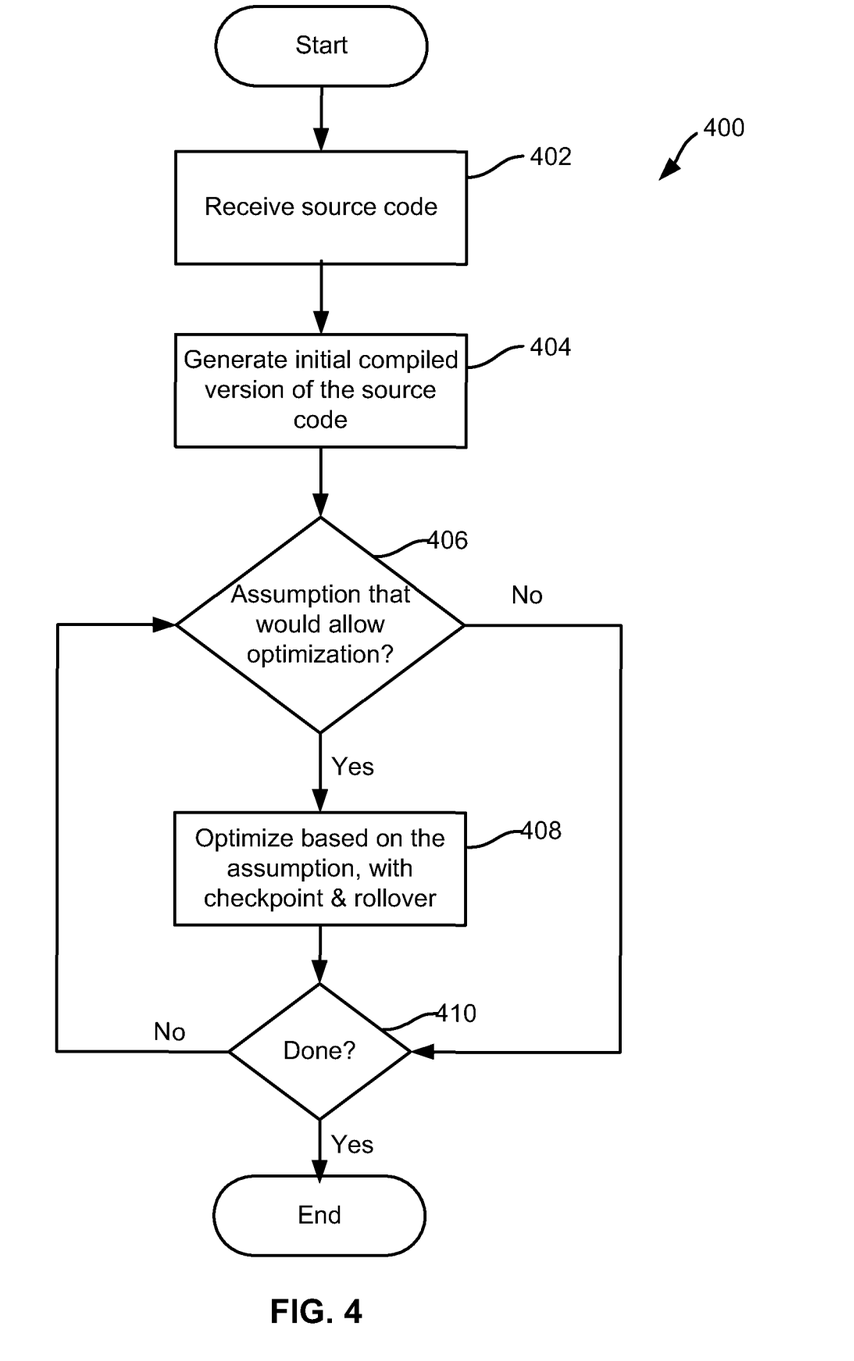
FIG. 4 is a flow diagram of an embodiment of a process for generating compiled code and fallback code, where the compiled code is based on an assumption and the fallback code is not.

FIG. 4 is a flow diagram of an embodiment of a process 400 for generating assumption-based compiled code and fallback code associated with a unit of source code, such as source code written in a traditionally interpreted language such as JavaScript®. In the example shown, source code is received (e.g., downloaded from or uploaded by another device) 402. An initial compiled version of the source code (e.g., compiled machine code specific to a platform and can be directly read by a processor) is generated 404. Analysis, such as static analysis of the source code and/or initial compiled code, and/or dynamic runtime analysis of the source code and/or initial compiled code, is performed to determine whether an assumption can be made that would allow an optimization of the initial compiled version of the source code (e.g., a section of the initial compiled version of the source code) 406. If an assumption based on which the initial compiled version of the source code can be optimized is found, the initial (or other current) compiled version of the source code is optimized based on the assumption to generate an optimized (or further optimized) compiled version of the source code 408. The optimized (or further optimized) compiled version of the source code includes in some embodiments one or more checkpoints for testing the validity of the assumption and for rolling over to fallback code if the assumption is tested not true. The process determines whether further optimization of the compiled version of the source code based on additional assumptions will be performed 406, 410. If yes, the steps 406, 408, and 410 are repeated to perform such further optimization. Analysis of the source and/or initially generated compiled code continues, and opportunities to optimize based on a potentially valid assumption (if any) are taken advantage of, until the entire code has been analyzed and no further opportunities for optimization based on an assumption are found 406, 410, at which time the process of FIG. 4 ends.

Figure 5:
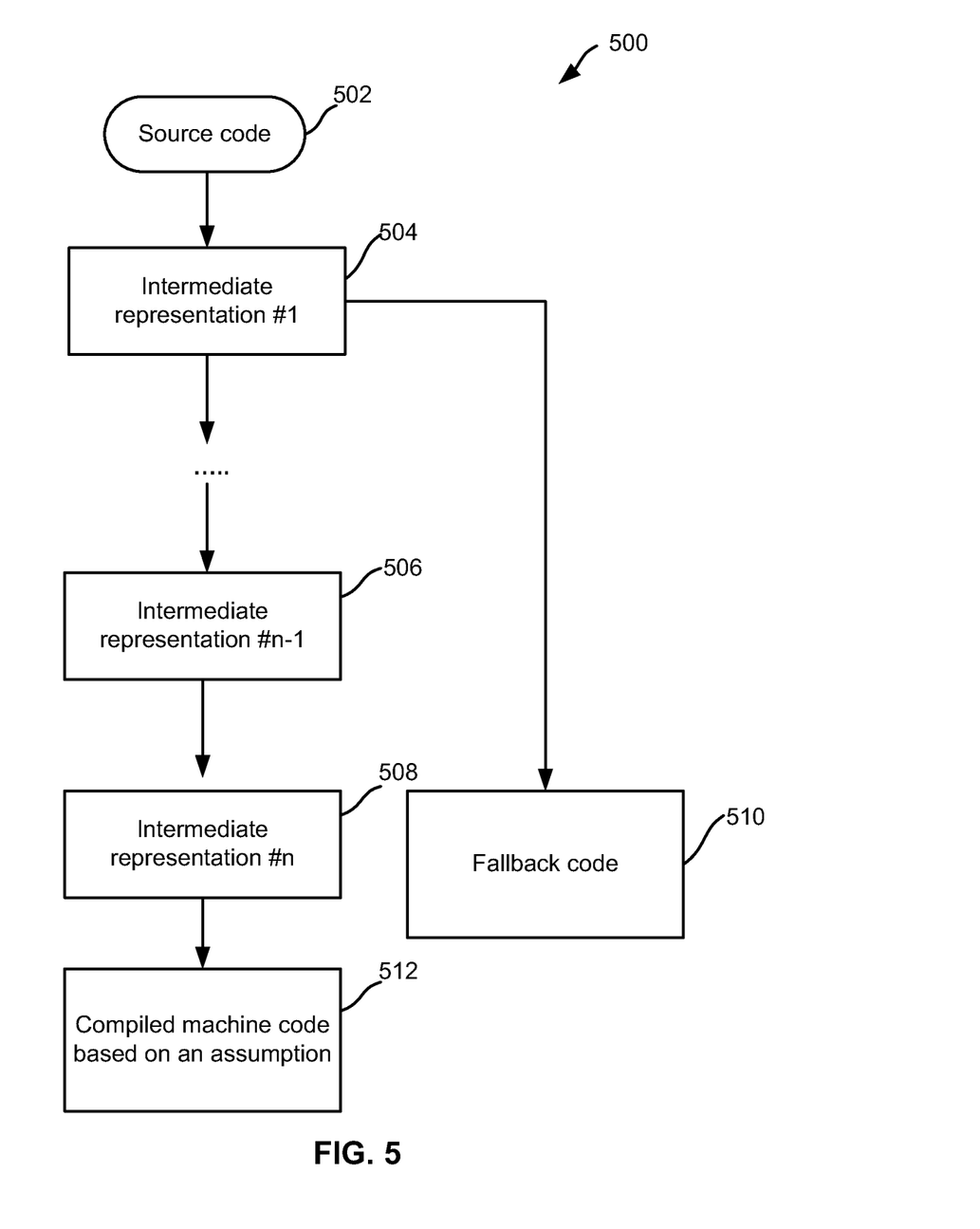
FIG. 5 is a flow diagram of an embodiment of a process for generating compiled code and fallback code, where the compiled code is based on an assumption and the fallback code is not.

FIG. 5 is a flow diagram for an embodiment of a process 500 for generating assumption-based compiled code and fallback code associated with a unit of source code. In the example shown, source code 502 is used to generate an initial intermediate representation 504 of the source code that is not optimized based on an assumption. The intermediate representation 504 in the example shown goes through successive rounds of optimization to generate subsequent intermediate representations represented in FIG. 5 by intermediate representations 506 and 508, the latter of which in this example is used ultimately to generate final assumption-based compiled code 512 that is optimized based on one or more assumptions. In some embodiments, the source code comprises JavaScript® and at least a subset of the intermediate representations shown in FIG. 5 comprise LLVM or other byte code, or another compiled or otherwise derived representation of the original source code. In the example shown, the final intermediate representation is used to generate assumption-based compiled code 512 that is optimized based on one or more assumptions. The initial intermediate representation 504 is used in this example to generate a compiled code that used as fallback code 510 that is not based on an assumption, e.g., one based on which an optimization of the initial intermediate representation 504 is performed to generate a subsequent, optimized intermediate representation. In some embodiments, for each intermediate representation that is optimized based on an assumption, corresponding fallback code is generated based on an intermediate version (e.g., 1 through n in this example) that is not based on that assumption, e.g., an intermediate version as it existed immediately prior to an optimization based on that assumption being performed. In some cases further or subsequent iterations of optimization may be facilitated by an assumption but may not themselves be based on any new assumption, so that not every intermediate representation would have or would require corresponding fallback code. In some embodiments, one or more assumptions may be made without new compiled fallback code being generated, and instead for example the original source code may be used as a fallback code if that particular assumption is found not to be true at runtime. While in the example shown in FIG. 5 multiple iterations of intermediate representation of the source code are generated, in other embodiments compilation may involve more or fewer stages than shown in FIG. 5.

Figure 6:
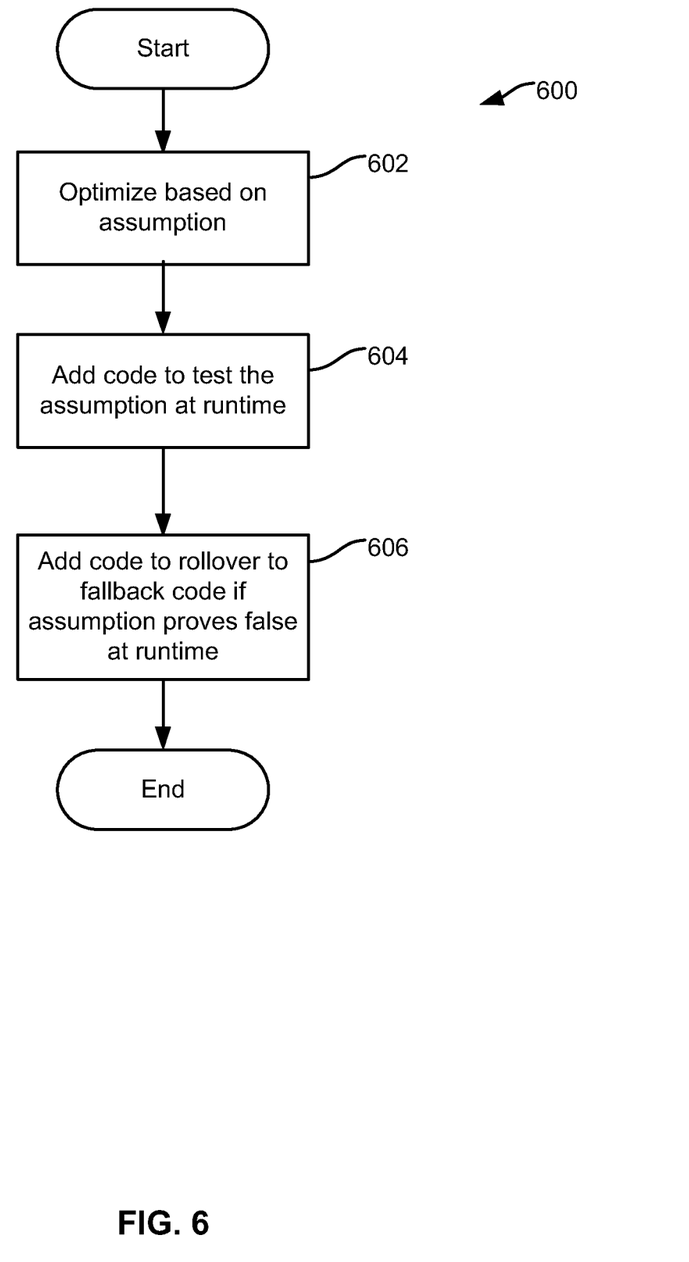
FIG. 6 is a flow diagram illustrating an embodiment of a process for optimizing compiled code based on an assumption.

FIG. 6 is a flow diagram illustrating an embodiment of a process 600 for optimizing compiled code based on an assumption (e.g., the step 408 of FIG. 4). In the example shown, the compiled code associated with the source code is optimized based on an assumption 602. Code for testing the assumption is true is added to the compiled code 604. Code for rolling over to fallback code, if the assumption is found at runtime not to be true, is added to the compiled code 606. In various embodiments, the process 600 is repeated for each assumption that is made.

Figure 7:
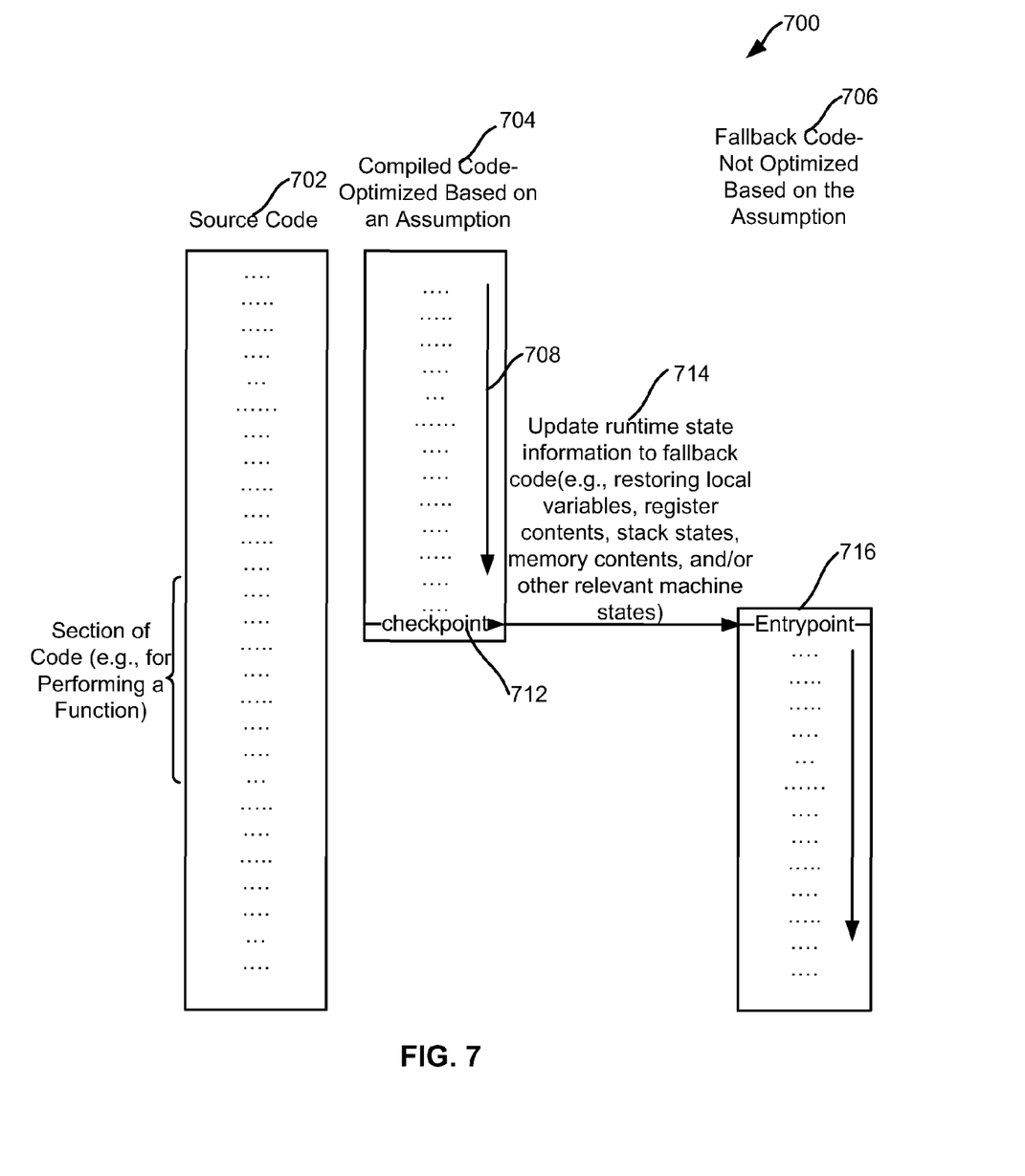
FIG. 7 is a flow diagram illustrating an embodiment of a process for rolling over from compiled code that is optimized based on an assumption to fallback code that is not optimized based on the assumption.

FIG. 7 is flow diagram illustrating an embodiment of a process 700 for rolling over from a unit of assumption-based compiled code to fallback code. In the example shown, assumption-based compiled code 704 associated with a unit of source code 702 is optimized based on an assumption. The compiled code 704 includes code configured to execute a roll over to fallback code 706 that is not optimized based on the assumption, beginning at an associated entry point 716. In the example shown, the fallback code 706 is compiled code of the source code 702 and is not optimized based on the assumption. In the example shown, when the source code 702 is invoked (e.g., when a user browses a webpage containing the source code), the assumption-based compiled code 704 is executed 708. At a checkpoint 712, the assumption is tested. If the assumption is tested true, execution of the assumption-based compiled code 704 continues (not shown in FIG. 7). If the assumption is tested false, rollover code included in the assumption-based compiled code 704 executes a rollover to fallback code 706, which may involve updating a runtime environment associated with the fallback code 706 to a state in which it would have been had the fallback code 706 been executing all along 714. Updating the runtime state may involve restoring local variables, register contents, stack states, memory contents, and/or other relevant machine states, which may be specific to the particular architectures/ABI involved. Execution of the fallback code 706 begins and continues from entry point 716 in the fallback code 706.

Figure 8:
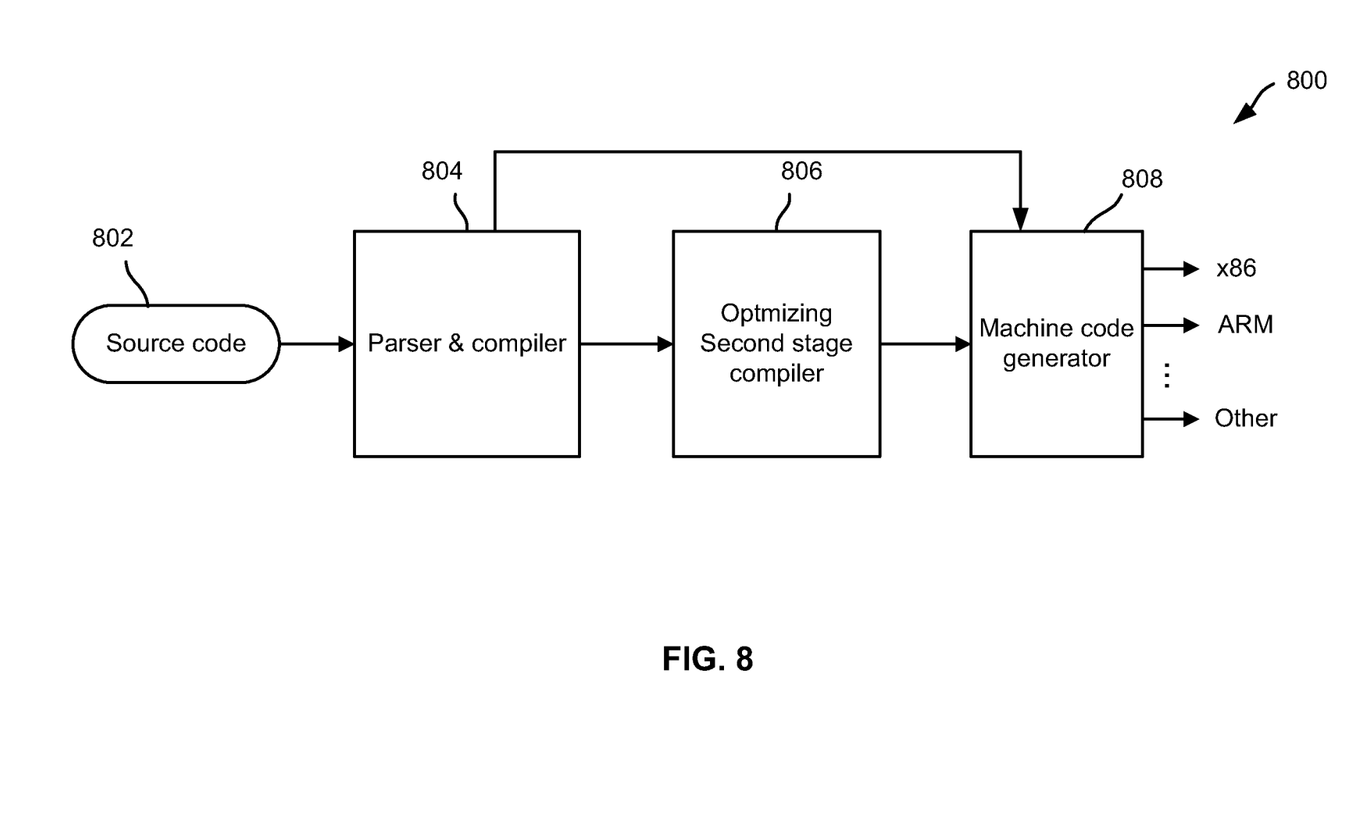
FIG. 8 is a block diagram illustrating an embodiment of a system for processing source code written in a traditionally interpreted language such as JavaScript®.

FIG. 8 is a block diagram illustrating an embodiment of a system 800 for generating compiled code that is based on (e.g., optimized based on) an assumption and fallback code that is not based on the assumption. In the example shown, source code 802 is provided to a parser and initial compiler 804, which parses the source code and generates an initial intermediate representation. In various embodiments, the initial intermediate representation may be bytecode or another derived representation of the original source code. The initial intermediate representation is provided to an optimizing second stage compiler 806, which performs one or more rounds of optimization on the initially generated intermediate representation and provides as output a second intermediate representation of the source code 802, e.g., low level virtual machine (LLVM) or another low level intermediate representation. The optimization may be based on one or more assumptions, for example as discussed above in connection with FIGS. 2 & 3. The system also includes a machine code generator 808 that is configured to use the initial and/or the second (and/or other subsequent) intermediate representations to generate device-specific or computing-platform-specific machine code, e.g., machine code appropriate to processors of the x86, ARM, or other architectures. The generated machine code may be cached in the data storage and made available to each of one or more devices or systems, for example at a subsequent device synchronization time with the one or more devices or systems, machine code appropriate for that device or system. In some embodiments, the machine code generated based on the second intermediate representation and the machine code generated based on the initial intermediate representation are used as the compiled code optimized based on an assumption and the fallback code, respectively, for the processes discussed in reference to FIGS. 2 & 3.

Figure 9:
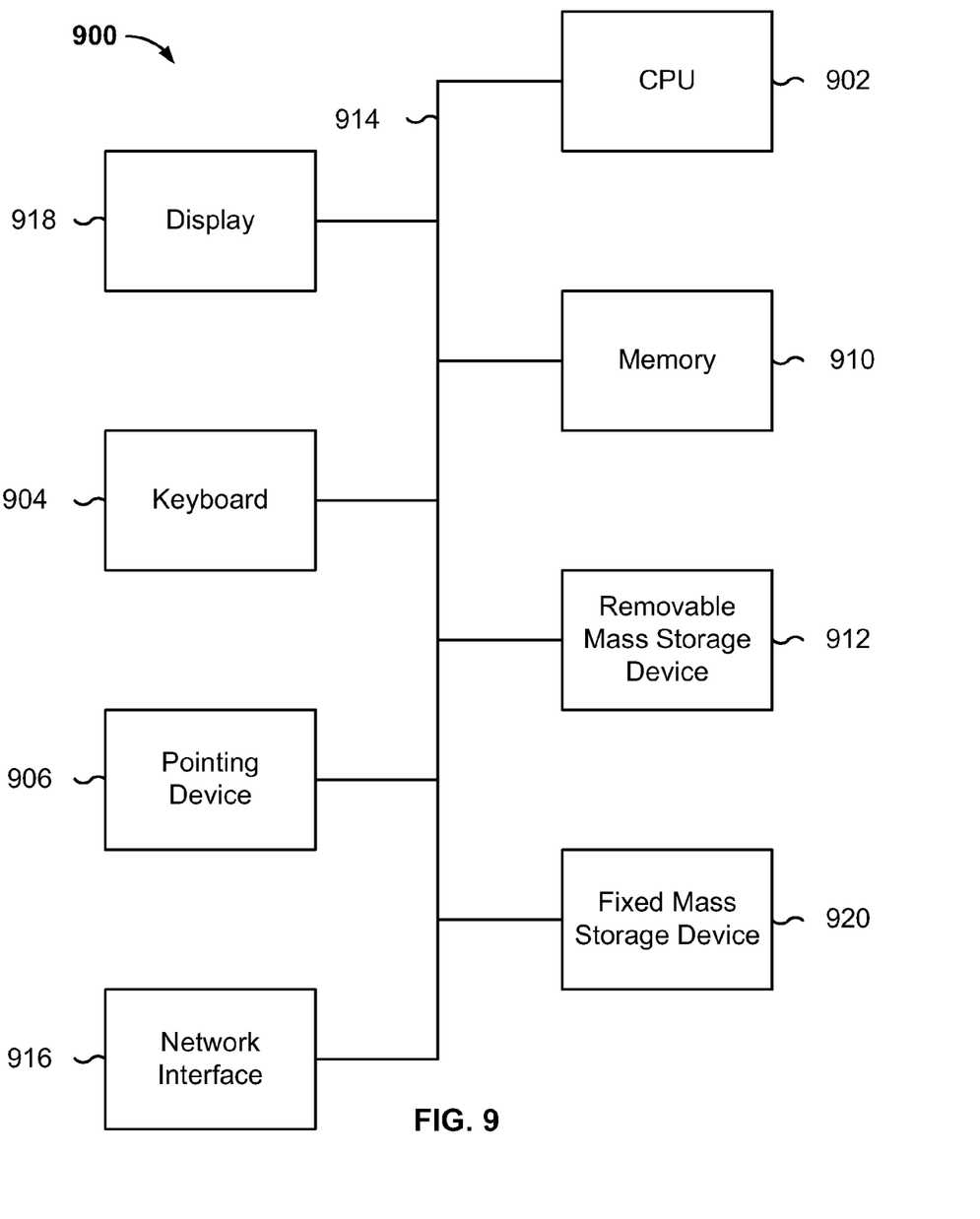
FIG. 9 is a block diagram showing an embodiment of a system for processing source code written in a traditionally interpreted language such as JavaScript®.

FIG. 9 is a block diagram of a computer system 900 used in some embodiments to process software code as described herein. FIG. 9 illustrates one embodiment of a general purpose computer system. Other computer system architectures and configurations can be used for carrying out the processing described herein. Computer system 900, made up of various subsystems described below, includes at least one microprocessor subsystem (also referred to as a central processing unit, or CPU) 902. That is, CPU 902 can be implemented by a single-chip processor or by multiple processors. In some embodiments CPU 902 is a general purpose digital processor which controls the operation of the computer system 900. Using instructions retrieved from memory 910, the CPU 902 controls the reception and manipulation of input data, and the output and display of data on output devices.

CPU 902 is coupled bi-directionally with memory 910 which can include a first primary storage, typically a random access memory (RAM), and a second primary storage area, typically a read-only memory (ROM). A removable mass storage device 912 provides additional data storage capacity for the computer system 900. Storage 912 may also include computer-readable media such as magnetic tape, flash memory, signals embodied on a carrier wave, PC-CARDS, portable mass storage devices, holographic storage devices, and other storage devices. A fixed mass storage 920 can also provide additional data storage capacity. A common example of mass storage 920 is a hard disk drive.

In addition to providing CPU 902 access to storage subsystems, bus 914 can be used to provide access other subsystems and devices as well. In the described embodiment, these can include a display monitor 918, a network interface 916, a keyboard 904, and a pointing device 906, as well as an auxiliary input/output device interface, a sound card, speakers, and other subsystems as needed. The pointing device 906 may be a mouse, stylus, track ball, or tablet, and is useful for interacting with a graphical user interface. The network interface 916 allows CPU 902 to be coupled to another computer, computer network, or telecommunications network using a network connection as shown.

The computer system shown in FIG. 9 is but an example of a computer system suitable to implement techniques described herein. Other computer systems suitable for such use may include additional or fewer subsystems.

Figure 10:
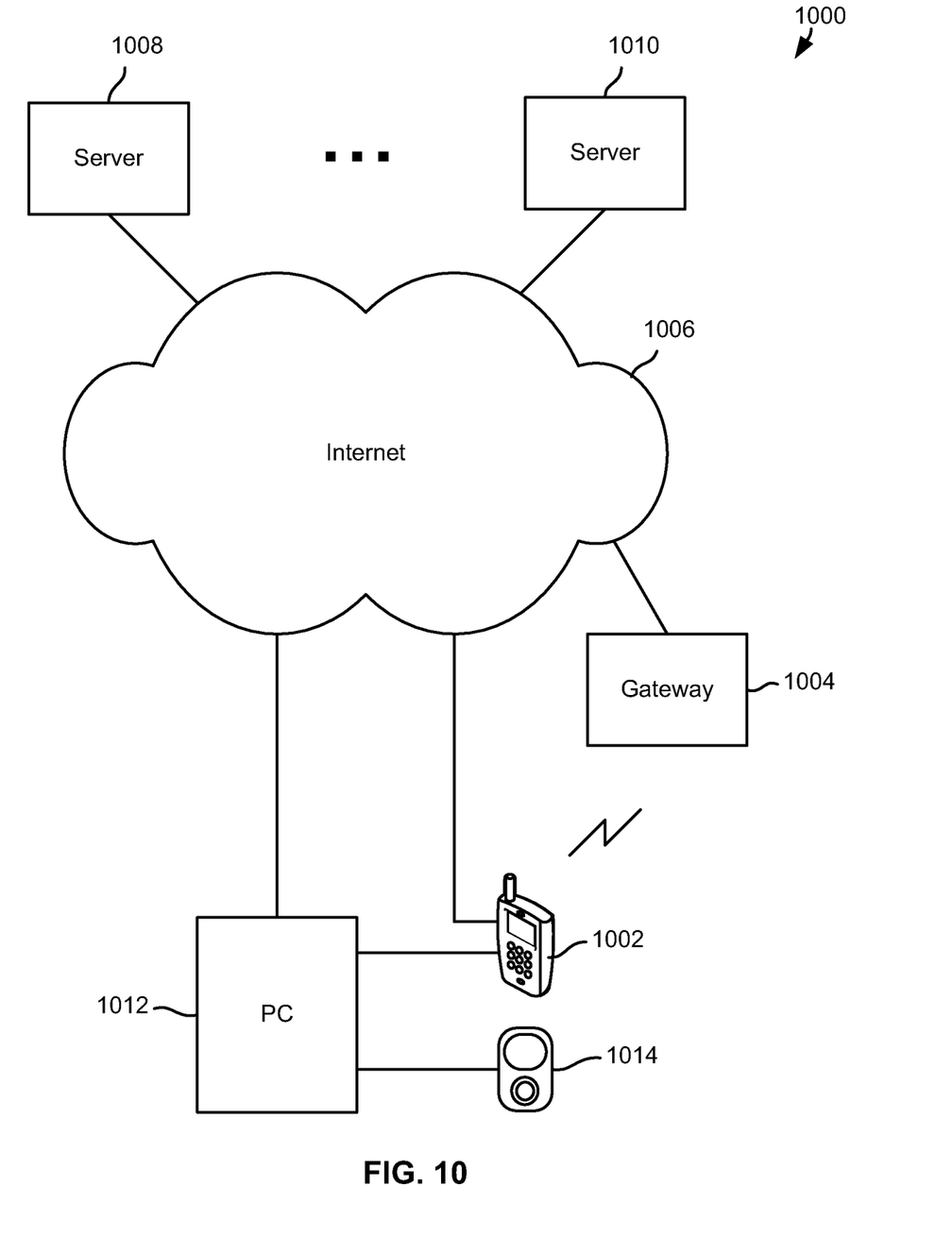
FIG. 10 is a block diagram illustrating an embodiment of a system for processing source code written in a traditionally interpreted language such as JavaScript®.

FIG. 10 is a block diagram illustrating an embodiment of a system for processing a source code written in a traditionally interpreted dynamic language such as JavaScript®. In the example shown, a device 1002 such as a phone, PDA, portable computer, or other device is directly connected up to a network via land wire and/or wirelessly through a gateway 1004 (in various embodiments through one or more other networks, nodes, and/or devices not shown in FIG. 10), and via the network with one or more web or other devices (e.g., server 1008, 1010). In various embodiments, the device 1002 is configured to access web pages, web applications, applets, widgets, or other resources available for download from servers such as servers 1008 and 1010, all or some of which resources may include JavaScript® or other traditionally interpreted code. In various embodiments, the device 1002 is configured to execute various computer codes such as a source code (e.g., a source code written in traditionally interpreted dynamic language such as JavaScript®), a compiled code of a source code (e.g., compiled code that is based on or not based on an assumption), and/or other derived code of the source code such as a device independent intermediate representation of the source code (e.g., intermediate representation). In various embodiments, the device 1002 is configured to in some instances download computer code from another device or system (e.g., server 1008, 1010). In various embodiments, the device 1002 is configured to, upon the initial download of the source code written in interpreted language such as JavaScript®, generate, optimize, and/or cache an intermediate and/or other compile representation of the downloaded source code. In various embodiments, the device is configured to generate, optimize, and/or cache (e.g., prior to runtime or dynamically at runtime) a compiled machine code of the source code that is specific to the computing platform it is generated for and/or which is based on an assumption, as described above. In some embodiments, the device 1002 implements one or more of the processes of FIGS. 2-6. In various embodiments, the device is configured to cache the downloaded or generated code in data storage. In various embodiments, the device 1002 is configured to make the cached computer codes available to other devices (e.g., server 1008, 1010, device 1014, and personal computer 1012) upon synchronization with the one or more devices.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method for executing a unit of code, the method comprising:
    receiving the unit of code, wherein the unit of code includes:
        a fallback code that is based on a source code, and
        a compiled code derived from the source code, wherein the compiled code:
            is based on at least one assumption associated with a runtime environment during execution of the compiled code, and
            when executed, implements one or more checkpoints for determining whether the at least one assumption holds true;
    executing, via a processor, the compiled code;
    encountering a particular one of the one or more checkpoints;
    at the particular one checkpoint, determining whether the at least one assumption holds true; and
    upon determining that the at least one assumption does not hold true:
        rolling over to and executing the fallback code, by performing steps that include:
            updating the runtime environment to a specific state that represents one that would have otherwise been present had the fallback code been executed in place of the compiled code, wherein updating the runtime environment includes:
                restoring at least one local variable based on the specific state, and maintaining global variables.

2. The method of claim 1, wherein the compiled code includes instructions for implementing each of the one or more checkpoints.

3. The method of claim 1, wherein the compiled code includes instructions for rolling over to the fallback code when it is determined that the assumption does not hold true.

4. The method of claim 1, wherein the fallback code comprises the source code.

5. The method of claim 1, wherein the compiled code comprises machine-level code that is based on the source code, and the fallback code comprises intermediate-level code that is based on the source code.

6. The method of claim 1, wherein updating the runtime environment further includes updating a stack based on the specific state.

7. The method of claim 1, wherein the source code comprises code that is written in an interpreted programming language.

8. The method of claim 1, wherein the source code comprises JavaScript.

9. A system configured to execute a unit of code, the system comprising:
    a processor; and
    a memory storing instructions that, when executed by the processor, cause the system to:
        receive the unit of code, wherein the unit of code includes:
            a fallback code that is based on a source code, and
            a compiled code derived from the source code, wherein the compiled code:
                is based on at least one assumption associated with a runtime environment during execution of the compiled code, and
                when executed, implements one or more checkpoints for determining whether the at least one assumption holds true;
        execute, via a processor, the compiled code;
        encounter a particular one of the one or more checkpoints;
        at the particular one checkpoint, determine whether the at least one assumption holds true; and
        upon determining that the at least one assumption does not hold true:
            roll over to and executing the fallback code, by performing steps that include:
                updating the runtime environment to a specific state that represents one that would have otherwise been present had the fallback code been executed in place of the compiled code, wherein updating the runtime environment includes:
                    updating a stack associated with the fallback code, which includes restoring one or more local variables to the stack based on the specific state, and maintaining global variables within the stack.

10. The system of claim 9, wherein the compiled code includes instructions for implementing each of the one or more checkpoints.

11. The system of claim 9, wherein the compiled code includes instructions for rolling over to the fallback code when it is determined that the assumption does not hold true.

12. The system of claim 9, wherein the fallback code comprises the source code.

13. The system of claim 9, wherein the compiled code comprises machine-level code that is based on the source code, and the fallback code comprises the source code, the source code being written in a runtime-interpretable language.

14. A non-transitory computer readable storage medium configured to store instructions that, when executed by a processor included in a computing device, cause the computing device to execute a unit of code, by carrying out steps that include:
    receiving the unit of code, wherein the unit of code includes:
        a fallback code that is based on a source code, and
        a compiled code derived from the source code, wherein the compiled code:
            is based on at least one assumption associated with a runtime environment during execution of the compiled code, and
            when executed, implements one or more checkpoints for determining whether the at least one assumption holds true;
    executing, via a processor, the compiled code;
    encountering a particular one of the one or more checkpoints;
    at the particular one checkpoint, determining whether the at least one assumption holds true; and
    upon determining that the at least one assumption does not hold true:
    rolling over to and executing the fallback code, by performing steps that include:
        updating the runtime environment to a specific state that represents one that would have otherwise been present had the fallback code been executed in place of the compiled code, wherein updating the runtime environment includes:
            restoring at least one local variable based on the specific state, and
            maintaining global variables.

15. The non-transitory computer readable storage medium of claim 14, wherein the compiled code includes instructions for implementing each of the one or more checkpoints.

16. The non-transitory computer readable storage medium of claim 14, wherein the compiled code includes instructions for rolling over to the fallback code when it is determined that the assumption does not hold true.

17. A method for providing a unit of code, the method comprising:
    performing an analysis of a source code to identify at least one assumption that can be made relative to a runtime environment that will be present when a compiled code derived from the source code is executed;
    based on the analysis, providing, via a processor, the unit of code, wherein the unit of code includes:
        a fallback code that is based on the source code, and
        the compiled code, wherein the compiled code is based on the at least one assumption associated with the runtime environment, and, when the compiled code is executed by the processor, the compiled code implements:
            one or more checkpoints for determining whether the at least one assumption holds true, and
            a procedure to cause a transition from executing the compiled code to executing the fallback code when, by way of at least one of the one or more checkpoints, the at least one assumption no longer holds true, wherein the procedure includes:
                updating the runtime environment to a specific state that represents one that would have otherwise been present had the fallback code been executed in place of the compiled code, by carrying out steps that include:
                    restoring at least one local variable based on the specific state, and
                    maintaining global variables.

18. The method of claim 17, wherein the fallback code comprises the source code or an intermediate representation of the source code.

19. The method of claim 17, wherein the compiled code comprises machine-level code that is based on the source code, and the fallback code comprises intermediate-level code that is based on the source code.

20. The method of claim 17, wherein the compiled code comprises a first compiled version of the source code and the fallback code comprises a second compiled version of the source code, and the first version is not equivalent to the second version.

21. The method of claim 17, wherein updating the runtime environment further includes a step that involves updating a stack based on the specific state.

22. A system, comprising:
a processor; and
a memory storing instructions that, when executed by the processor, cause the system to provide a unit of code, by carrying out steps that include:
performing an analysis of a source code to identify at least one assumption that can be made relative to a runtime environment that will be present when a compiled code derived from the source code is executed;
based on the analysis, providing, via the processor, the unit of code, wherein the unit of code includes:
a fallback code that is based on the source code, and the compiled code, wherein the compiled code is based on the at least one assumption associated with the runtime environment, and, when the compiled code is executed by the processor, the compiled code implements:
one or more checkpoints for determining whether the at least one assumption holds true, and
a procedure to cause a transition from executing the compiled code to executing the fallback code when, by way of at least one of the one or more checkpoints, the at least one assumption no longer holds true, wherein the procedure includes:
updating the runtime environment to a specific state that represents one that would have otherwise been present had the fallback code been executed in place of the compiled code, by carrying out steps that include:
restoring at least one local variable based on the specific state, and
maintaining global variables.

23. The system of claim 22, wherein the fallback code comprises the source code or an intermediate representation of the source code.

24. The system of claim 22, wherein the compiled code comprises machine-level code that is based on the source code, and the fallback code comprises intermediate-level code that is based on the source code.

25. The system of claim 22, wherein updating the runtime environment further includes a step that involves updating a stack based on the specific state.

* * * * *